US012674055B2

(12) United States Patent
Itahashi et al.

(10) Patent No.: US 12,674,055 B2
(45) Date of Patent: Jul. 7, 2026

(54) PHLOROGLUCINOLIC RESINS, METHODS OF MAKING, AND USES IN RUBBER COMPOSITIONS

(71) Applicants: SUMITOMO CHEMICAL ADVANCED TECHNOLOGIES, LLC, Phoenix, AZ (US); Sumitomo Chemical Company, Limited, Tokyo (JP)

(72) Inventors: Tamon Itahashi, Cheswick, PA (US); Toshihiro Nobuoka, Pittsburgh, PA (US); Michael C. Walkup, New Kensington, PA (US)

(73) Assignees: Sumitomo Chemical Advanced Technologies LLC, Phoenix, AZ (US); Sumitomo Chemical Company, Limited, Tokyo (JP)

(*) Notice: Subject to any disclaimer, the term of this patent is extended or adjusted under 35 U.S.C. 154(b) by 923 days.

(21) Appl. No.: 17/791,688

(22) PCT Filed: Jan. 6, 2021

(86) PCT No.: PCT/US2021/012237
§ 371 (c)(1),
(2) Date: Jul. 8, 2022

(87) PCT Pub. No.: WO2021/141934
PCT Pub. Date: Jul. 15, 2021

(65) Prior Publication Data

US 2023/0064028 A1 Mar. 2, 2023

Related U.S. Application Data

(60) Provisional application No. 62/958,789, filed on Jan. 9, 2020.

(51) Int. Cl.

| | |
|---|---|
| ***C08L 61/16*** | (2006.01) |
| ***C08G 8/02*** | (2006.01) |
| ***C08G 8/20*** | (2006.01) |
| ***C08L 7/00*** | (2006.01) |
| ***C08L 21/00*** | (2006.01) |
| ***C09J 161/12*** | (2006.01) |

(52) U.S. Cl.
CPC ................ *C08L 61/16* (2013.01); *C08G 8/02* (2013.01); *C08G 8/20* (2013.01); *C08L 7/00* (2013.01); *C08L 21/00* (2013.01); *C09J 161/12* (2013.01)

(58) Field of Classification Search
CPC .. C08L 61/16; C08L 61/00; C08L 7/00; C08L 21/00; C08G 8/02; C08G 8/20
See application file for complete search history.

(56) References Cited

U.S. PATENT DOCUMENTS

| | | | | |
|---|---|---|---|---|
| 2,462,608 | A * | 2/1949 | Burroughs | C09D 145/02 524/549 |
| 2,477,641 | A | 8/1949 | Nagel et al. | |
| 11,236,190 | B2 | 2/2022 | Itahashi et al. | |
| 12,072,630 | B2 | 8/2024 | Tokunaga et al. | |
| 2011/0144234 | A1 | 6/2011 | Naoki | |
| 2014/0235125 | A1 | 8/2014 | Doisneau et al. | |
| 2017/0153548 | A1 | 6/2017 | Nishimaki et al. | |
| 2017/0174006 | A1 | 6/2017 | Michoud et al. | |
| 2018/0009972 | A1 | 1/2018 | Doisneau et al. | |
| 2019/0119535 | A1 | 4/2019 | Doisneau et al. | |
| 2019/0145493 | A1 | 5/2019 | Doisneau et al. | |

FOREIGN PATENT DOCUMENTS

| | | | |
|---|---|---|---|
| GB | 590622 | A | 7/1947 |
| JP | 2000037963 | A * | 2/2000 |
| JP | 2001506769 | A | 4/2001 |

(Continued)

OTHER PUBLICATIONS

Malhotra, H.C. et al, "Acid catalyzed condensation of phloroglucinol and acetone—kinetics and mechanism", Iranian Journal of Chemistry and Chemical, 1991, vol. 10, No. 1, pp. 51-58.

(Continued)

*Primary Examiner* — Marc S Zimmer
*Assistant Examiner* — Surbhi M Du
(74) *Attorney, Agent, or Firm* — Renner, Kenner, Greive, Bobak, Taylor & Weber Co. LPA

(57) ABSTRACT

A solid phloroglucinolic resin comprises reacting a phloroglucinolic compound and a ketone in the presence of an acid catalyst. The solid phloroglucinolic resin formed includes multiple phloroglucinolic units defined by formula (I)

(I)

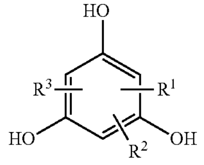

wherein at least one of R1, R2, and R3 combines with a second phloroglucinolic unit to form a di-substituted methylene bridge, wherein the second one of R1, R2, and R3 is a hydrogen atom or combines with a third phloroglucinolic unit to form another di-substituted methylene bridge, and wherein the third one of R1, R2 and R3 is a hydrogen atom.

18 Claims, No Drawings

(56) References Cited

FOREIGN PATENT DOCUMENTS

WO 2019/225614 A1 11/2019

OTHER PUBLICATIONS

Wang J. et al, "The mechanism of the reaction between resorcinol and acetone", Journal of Chemical Industry and Engineering (China), 2005, vol. 56, No. 7, pp. 1236-1241.

First Office Action for Chinese patent application 2021800082283 (Corresponding U.S. Appl. No. 17/791,688 ).

OA for Japanese Patent Application No. 2022-542151.

Pizzi et al: "Condensates of phenol, resorcinol, phloroglucinol, and pyrogallol as model compounds of flavoniod A- and B-rings with formaldehyde", CA, Chemical Abstracts Service, Columbus Ohio US, Jan. 1, 1979 (Jan. 1, 1979), XP002792003, DOI: 10.1002/APP.1979.070240618 p. 1575; compounds VII, VIII.

* cited by examiner

PHLOROGLUCINOLIC RESINS, METHODS OF MAKING, AND USES IN RUBBER COMPOSITIONS

FIELD OF THE INVENTION

This invention relates to solid phloroglucinolic resins and methods for making the same. Such solid phloroglucinolic resins may be useful in vulcanizable rubber compositions.

BACKGROUND OF THE INVENTION

Resorcinol-formaldehyde resins, also referred to as RF resins or resorcinolic resins, which are formed as the reaction product of resorcinol and formaldehyde, have been widely used in various applications including rubber compounding. In rubber compound formulations, solid RF resins have long been used to enhance rubber properties such as the adhesion properties between rubber and reinforcing materials and the dynamic properties in articles such as tires, belts and hose products.

Resorcinolic resins generally have 10 to 20% unreacted or free resorcinol. The amount of free resorcinol can be a critical factor when balancing important properties. The presence of free resorcinol, however, can be problematic. For example, free resorcinol can volatilize during rubber mixing, such volatilization is often referred to as fuming, and thereby creates added issues to the rubber mixing process. Further, the presence of the free resorcinol contributes to the hygroscopicity of the resorcinolic resin, which in turn creates storage and handling problems.

Formaldehyde has been used to produce resorcinol-formaldehyde resins for many years. In view of its widespread use, toxicity, and volatility, formaldehyde presents potential health and environmental problems. In 2011, the US National Toxicology Program described formaldehyde as known to be a human carcinogen.

Accordingly, the need exists to create environmentally friendly adhesives that do not use resorcinol and formaldehyde (or other aldehydes). Unfortunately, all known prior art adhesive resins to date that do not include resorcinol and formaldehyde have generally been found to have lower reactivity that results in unsatisfactory rubber performance and/or processing issues. For example, a resin's softening point may be adversely affected, causing difficulty in use and processing. That is, a softening point that is too high causes difficulty during mixing with the rubber compound, while a softening point that is too low leads to handling issues. Therefore, it is necessary to balance the competing factors of reactivity and softening point.

The use of phloroglucinols in aqueous adhesive compositions is well known in the art. For example, in U.S. Patent Application Publication No. US 2014/0235125 an aqueous adhesive composition is noted to include a phenol/aldehyde resin; and an unsaturated elastomer latex. The phenol/aldehyde resin is based on at least an aromatic polyaldehyde bearing at least two aldehyde functional groups and including at least one aromatic nucleus; and phloroglucinol.

In U.S. Patent Application Publication No. US 2019/0119535, an aqueous adhesive composition includes a thermosetting resin and an unsaturated elastomer latex. The thermosetting resin may include an aromatic compound bearing at least two functions, one of those functions being a hydroxymethyl function, and the other being an aldehyde function or a hydroxymethyl function. Generally, while phloroglucinol is disclosed in both references, both compositions are noted to be aqueous (not a solid) and preferably contains an aldehyde (not a ketone).

SUMMARY OF THE INVENTION

At least one aspect of the present invention provides a solid phloroglucinolic resin comprising the reaction product of a phloroglucinolic compound, preferably a phloroglucinol, and a ketone. In various embodiments, the ketone may be selected from the group consisting of acetone, methyl ethyl ketone, diethyl ketone, ethyl butyl ketone, diisobutyl ketone, methyl isopropyl ketone, diisopropyl ketone, and methyl isobutyl ketone. In other embodiments, the ketone may be selected from the group consisting of acetone, methyl ethyl ketone, and methyl isobutyl ketone. In at least one embodiment, the ketone is acetone. In another embodiment, the ketone is methyl ethyl ketone. In yet another embodiment, the ketone is methyl isobutyl ketone.

In order to produce the solid phloroglucinolic resin, the phloroglucinolic compound is reacted with a ketone in the presence of an acid catalyst. In at least one embodiment, the acid catalyst is selected from inorganic acids, acid cation exchange resins, and combinations thereof. In at least one embodiment, the inorganic acid is thioglycolic acid. In at least another embodiment, the acid cation exchange resins include sulfuric acid or hydrochloric acid.

Still other aspects of the invention provide a vulcanizable rubber composition comprising a vulcanizable rubber; a curative; and solid phloroglucinolic resin comprising the reaction product of a phloroglucinolic compound and a ketone. Furthermore and advantageously, it will be appreciated that the vulcanized rubber compositions of the present invention exhibit advantageous rubber properties such as the adhesion, hardness, and dynamic properties compared to conventional products, without affecting cure times upon vulcanization.

Generally, it will be appreciated that the present invention provides a solid phloroglucinolic resin including multiple phloroglucinolic units defined by formula (I)

(I)

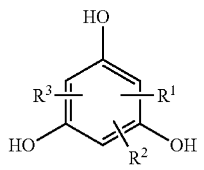

wherein at least one of R1, R2, and R3 combines with a second phloroglucinolic unit to form a di-substituted methylene bridge, wherein the second one of R1, R2, and R3 is a hydrogen atom or combines with a third phloroglucinolic unit to form another di-substituted methylene bridge, and wherein the third one of R1, R2 and R3 is a hydrogen atom.

More particularly, the present invention also provides the solid phloroglucinolic resin, as above, further defined by formula (II)

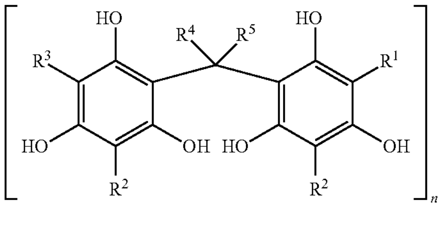

wherein n is an integer from 1 to 20, wherein R1 in a first phloroglucinolic unit on the left has been replaced with a di-substituted methylene bridge at the 2 position, and R3 in the second phloroglucinolic unit on the right has been replaced with the same di-substituted methylene bridge at the 6 position; wherein R3 on the first phloroglucinolic unit on the left and R1 on the second phloroglucinolic unit on the right form separate di-substituted methylene bridges, or can be a hydrogen atom, while R2 is a hydrogen atom, and wherein R4 and R5 may be the same or different, and are alkyl groups.

In some embodiments based upon the resin above, the solid phloroglucinolic resin may have R4 and R5 as both being methyl groups, wherein the di-substituted methylene bridge formed is an isopropyliden bridge. In other embodiments based upon the resin above, R4 may be an ethyl group and R5 may be a methyl group, wherein the di-substituted methylene bridge formed is a 2,2 di-substituted butane bridge. In still other embodiments based upon the resin above, R4 may be an isopropyl group and R5 may be a methyl group, wherein the di-substituted methylene bridge formed is a 2,2 di-substituted, 4-methyl pentane bridge.

It is yet another aspect of the invention to provide a solid phloroglucinolic resin comprising the reaction product of a phloroglucinol and a ketone in the presence of an acid catalyst. For such a resin, the ketone may be selected from the group consisting of acetone, methyl ethyl ketone (MEK), diethyl ketone, ethyl butyl ketone, diisobutyl ketone, methyl isopropyl ketone, diisopropyl ketone, and methyl isobutyl ketone (MIBK). In some embodiments, the ketone may be selected from the group consisting of acetone, methyl ethyl ketone, and methyl isobutyl ketone. In some embodiments, the acid catalyst is selected from the group consisting of inorganic acids and acid cation exchange resins.

In one or more embodiments based upon the resins above, a molar ratio of ketone to phloroglucinol may be more than 1:1 and less than 20:1. In one or more embodiments based upon the resins above, the resin may include less than 40 wt. % unreacted phloroglucinol. In one or more embodiments based upon the resins above, the resin may have a weight average molecular weight (Mw) of greater than 400 and less than 700 g/mole. In one or more embodiments based upon the resins above, the resin may have a softening point of greater than 80° C. In one or more embodiments based upon the resins above, the resin may include less than 1.5 wt. % water. In one or more embodiments based upon the resins above, the resin may have pentamer or higher oligomer content of less than 55% according to GPC using a polystyrene standard.

It is still another aspect of the present invention to provide a vulcanizable rubber composition comprising a vulcanizable rubber, a curative, and a solid phloroglucinolic resin as described above. In yet another aspect, a vulcanized rubber prepared from the vulcanizable composition above may be provided.

DETAILED DESCRIPTION

The present invention is based, at least in part, on the discovery of a solid phloroglucinolic resin that can replace a solid RF resin when compounded into a vulcanizable rubber composition. Such a solid phloroglucinolic resin does not use resorcinol or an aldehyde, such as formaldehyde. Instead, the solid phloroglucinolic resin includes a plurality of phloroglucinolic units generally defined by the formula (I)

(I)

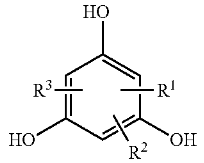

wherein at least one of R1, R2, and R3 combines with a second phloroglucinolic unit to form a di-substituted methylene bridge, wherein the second one of R1, R2, and R3 is a hydrogen atom or, combines with a third phloroglucinolic unit to form another di-substituted methylene bridge, and wherein the third one of R1, R2 and R3 is a hydrogen atom. The structure employed in formula (I) is intended to represent the fact that the di-substituted methylene bridge(s) of R1, R2 or R3 can be bonded to the 2, 4, or 6 position on the aromatic ring. Also, the hydrogen atom of R1, R2 or R3 is also located at the 2, 4, or 6 positions. The skilled person will appreciate that any carbon atom within the aromatic ring that is not bonded to a hydroxyl group, can bond to R1, R2, or R3, and will include either a hydrogen atom or be a part of a di-substituted methylene bridge.

Generally, the di-substituted methylene bridge includes a methylene bridge with at least two C1 to C10 alkyl groups extending from the methylene bridge. In another embodiment, the methylene bridge includes at least two C1 to C5 alkyl groups extending therefrom. In yet another embodiment, the methylene bridge includes at least two C1 to C4 alkyl groups extending therefrom. In still another embodiment, the methylene bridge includes at least two C1 to C3 alkyl groups extending therefrom. In yet a further embodiment, the methylene bridge includes at least two C1 to C2 alkyl groups extending therefrom.

More particularly, the phloroglucinolic resin of the present invention may be described as shown in Formula (II)

(II)

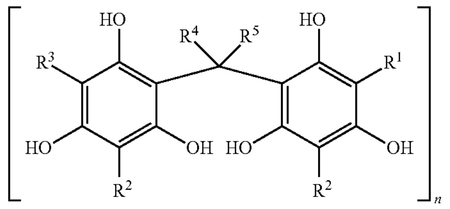

wherein n is an integer from 1 to 20, wherein R1 in the phloroglucinolic unit on the left has been replaced with a di-substituted methylene bridge as shown at the 2 position, and R3 in the phloroglucinolic unit on the right has been replaced at the 6 position. R3 on the left and R1 on the right can also be the same di-substituted methylene bridge as shown for herein, or can be a hydrogen atom, while R2 can be a hydrogen atom in this embodiment shown. R4 and R5 may be the same or different, and are alkyl groups. In one embodiment, R4 and R5 may both be methyl groups, wherein the di-substituted methylene bridge formed is an isopropyliden bridge. In another embodiment, R4 may be an ethyl group and R5 may be a methyl group, wherein the di-substituted methylene bridge formed is a 2,2 di-substituted butane bridge. In still another embodiment, R4 may be an isopropyl group and R 5 may be a methyl group, wherein the di-substituted methylene bridge formed is a 2,2 di-substituted, 4-methyl pentane bridge. In some embodiments, n is an integer from 1 to 8 and in other embodiments, n is an integer from 1 to 5.

As suggested above, aspects of the invention benefit from the solid nature of the phloroglucinolic resins. Accordingly, the phloroglucinolic resins of the present invention can be characterized by the absence of or limited amounts of water present within the phloroglucinolic resin. In one or more embodiments, the solid phloroglucinolic resins of the present invention include less than 3 wt. %, in other embodiments less than 2 wt. %, in other embodiments less than 1 wt. %, in other embodiments less than 0.5 wt. %, in other embodiments less than 0.25 wt. %, and in other embodiments less than 0.10 wt. % water relative to the total weight of the solid resin. In one or more embodiments, the phloroglucinolic resins of the present invention are substantially devoid of water, which refers to that amount of water or less that would otherwise have an appreciable impact on the resins or their use. In particular embodiments, the phloroglucinolic resins of the present invention are devoid of water. As the skilled person appreciates, the amount of water in the resin can be determined by a variety of methods including, but not limited to, Karl Fischer titration methods. In particular embodiments, the amount of water is determined using a modified version of ASTM E 203, where the method is modified by replacing the injection septum with a stopper and the pulverized resin is added through this port.

The solid phloroglucinolic resins of the present invention are characterized by a low molecular weight. As the skilled person will appreciate, the molecular weight of phloroglucinolic resins can be determined using several methodologies, and the molecular weight is typically reported in terms of weight average molecular weight (Mw) or number average molecular weight (Mn). Useful techniques for determining the molecular weight of solid phloroglucinolic resins include gel permeation chromatography using polystyrene standards (GPC) or vapor phase osmometry.

In one or more embodiments, the solid phloroglucinolic resin compositions of the present invention may be characterized by weight average molecular weight (Mw), which may be determined by GPC using a polystyrene standard. In one or more embodiments, the Mw of the resin is greater than 270, in other embodiments greater than 290, in other embodiments greater than 310, in other embodiments greater than 350, and in other embodiments greater than 400 g/mole. In these or other embodiments, the Mw of the resin is less than 900, in other embodiments less than 800, and in other embodiments less than 700 g/mole. In these or other embodiments, the solid phloroglucinolic resin of the present invention may be characterized by a Mw that is from about 270 to about 900, in other embodiments from about 310 to about 900, in other embodiments from about 350 to about 800, and in other embodiments from about 400 to about 700 g/mole.

In one or more embodiments, the solid phloroglucinolic resin compositions of the present invention may be characterized by a softening point that is greater than 90° C., in other embodiments greater than 100° C., in other embodiments greater than 110° C., in other embodiments greater than 120° C., in other embodiments greater than 130° C., in other embodiments greater than 140° C., in other embodiments greater than 160° C. and in other embodiments greater than 180° C. In these or other embodiments, the solid phloroglucinolic resin of the present invention may be characterized by a softening point that is from about 80° C. to about 180° C., in other embodiments from about 95° C. to about 140° C., and in other embodiments from about 100° C. to about 130° C. The softening point of the resins can be determined according to the following method with reference to the latest edition of ASTM E 28 and ASTM D 6090, which are incorporated by reference herein in their entirety. This method can employ a Mettler softening point apparatus, which may include a control unit Model FP-90 or equivalent, a furnace Model FP-83 or equivalent, and cartridge assemblies, a timer, porcelain evaporating dishes (about 3" in diameter), and a hot plate. The method may employ cups of pitch type drilled to 0.257" opening (F drill), and a 440 stainless steel ball (0.2500" in diameter and must pass through cups). The apparatus may be calibrated according to ASTM D 6090. A resin sample (~15 grams) can be melted in a porcelain or aluminum evaporating dish on the surface of a hot plate at 600-650° F., for approximately 4 minutes. After melting, the sample can be poured into cups that had been preheated to at least the temperature of the molten resin. The quantity of resin sample poured into the cups should be such that after solidification, the excess can be removed with a heated spatula or putty knife. The sample can then be cooled to room temperature in a desiccator, the cartridge can then be assembled so that the ball rests on the top of the resin. The assembled cartridge is then placed in the furnace, which can be preset to 85° C. or 10-15° C. below the expected softening point. The heating rate can be set at 1° C./min. The cartridge can then be turned until it is locked into position. After 30 seconds, the operation of softening point apparatus can be initiated, thereby yielding the completed softening point measurement.

Depending upon the ketone used with the phloroglucinolic compound, a bridge structure is developed much like the methylene bridge structures set forth in known RF resins. More particularly, when a ketone is combined with a phloroglucinolic compound, such as a phloroglucinol, a solid phloroglucinolic resin is produced having a di-substituted methylene bridge structure and a relatively low molecular weight. Importantly, this new phloroglucinolic resin does not use resorcinol and formaldehyde.

More specifically, and in one or more embodiments, the phloroglucinolic resin of the present invention is generally prepared by reacting a phloroglucinolic compound with a ketone in the presence of an acid catalyst. That is, the phloroglucinolic resin comprises the reaction product of phloroglucinol and a ketone in the presence of an acid catalyst. As the skilled person appreciates, and as noted above, phloroglucinolic compounds include, but are not limited to, phloroglucinol, which is also referred to as trihydric phenol or 1,3,5-dihydroxy benzene, or free phloroglucinol. The chemical formula for phloroglucinol is set forth in Formula (III) below.

(III)

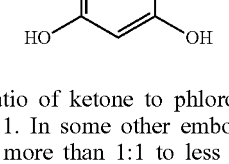

The molar ratio of ketone to phloroglucinol may vary from 1:1 to 20:1. In some other embodiments, the molar ratio may vary more than 1:1 to less than 20:1. In other embodiments, the molar ration may vary from 1.5:1 to 16:1, and in other embodiments, the molar ratio may vary from more than 1.5:1 to less than 15:1. In yet other embodiments, the molar ration may vary from 2:1 to 16:1, and in other embodiments, the molar ratio may vary from more than 2:1 to less than 15:1. In still other embodiments, the molar ratio of ketone to phloroglucinol may vary from about 1.5:1 to about 10:1, in other embodiments from about 1.5:1 to about 8:1, and in still other embodiments from about 2:1 to about 6:1.

In one or more embodiments, the ketone may be selected from the group consisting of acetone, methyl ethyl ketone, diethyl ketone, ethyl butyl ketone, diisobutyl ketone, methyl isopropyl ketone, diisopropyl ketone, and methyl isobutyl ketone. In particular embodiments, the ketone is acetone. In other embodiments the ketone is methyl ethyl ketone, and in still other embodiments, the ketone is methyl isobutyl ketone.

The condensation reaction of phloroglucinol with the ketone may be carried out in the presence of a catalyst. Useful catalysts include conventional acid catalysts. Examples of suitable acid catalysts include inorganic acids such as phosphoric acid, hydrochloric acid, and sulfuric acid and acid ion exchange resins such as acid cation exchange resins. Other catalysts can be used as well. Such catalysts include inorganic acid catalysts such as, for example, thioglycolic acid.

According to aspects of the invention, the reaction of the phloroglucinol (or phloroglucinolic compound) with a ketone is carried out in the presence of an organic solvent. Examples of suitable organic solvents include polar solvents and the non-polar solvents. In one or more embodiment, solvent may be selected from acetone, methyl isobutylketone (MIBK), methyl tert-butyl ether, cyclopentyl methyl ether, ethyl acetate, methanol, ethanol, isopropanol, n-propanol, acetonitrile, dimethyl sulfoxide, dimethyl formamide and tetrahydorofuran, chlorobenzene, dichrolobenzene, pentane, hexane, toluene and xylene. In one embodiment, acetone and toluene is preferably used.

In one or more embodiments, the reaction (formation of the resin) may be carried out in the temperature range of 10 to 150° C., and in other embodiments from about 25 to about 130° C. In one embodiment, the reaction temperature is more than 30° C., in another embodiment, the reaction temperature is more than 40° C., in another embodiment, the reaction temperature is more than 50° C., and in other embodiment, the reaction temperature is more than 60° C.

In one or more embodiments, the reaction of the phloroglucinolic compound with the aldehyde or ketone takes place in the presence of threshold amounts of the organic solvent. Specifically, the amount or organic solvent present during the reaction can be described with reference to the amount of phloroglucinol charged to the reaction (i.e. in the initial mixture). In one or more embodiments, the initial mixture in which the reaction takes place includes greater than 30 parts by weight, in other embodiments greater than 50 parts by weight and in other embodiments greater than 70 parts by weight organic solvent per 100 parts by weight phloroglucinol. In these or other embodiments, the mixture (prior to aldehyde addition) in which the reaction takes place includes greater less than 500 parts by weight, in other embodiments less than 400 parts by weight, and in other embodiments less than 300 parts by weight organic solvent per 100 parts by weight resorcinol. In one or more embodiments, the mixture in which the reaction takes place includes from about 30 to about 500, in other embodiments from about 50 to about 400, and in other embodiments from about 70 to about 300 by weight organic solvent per 100 parts by weight resorcinol.

The skilled person can readily determine the appropriate level of acid catalyst that should be used. The amount of acid catalyst introduced to the mixture and be described with reference to the amount of phloroglucinol initially present. In one or more embodiments, the initial mixture in which the reaction takes place includes greater than 0.1 parts by weight, in other embodiments greater than 0.2 parts by weight, in other embodiments greater than 0.5 parts by weight, in other embodiments greater than 1 parts by weight, in other embodiments greater than 2 parts by weight and in other embodiments greater than 5 parts by weight inorganic catalyst per 100 parts by weight phloroglucinol. In these or other embodiments, the mixture in which the reaction takes place includes greater less than 50 parts by weight, in other embodiments less than 40 parts by weight and in other embodiments less than 30 parts by weight inorganic catalyst per 100 parts by weight phloroglucinol. In one or more embodiments, the mixture in which the reaction takes place includes from about 0.1 to about 50, in other embodiments from about 1 to about 40, and in other embodiments from about 5 to about 30 parts by weight inorganic catalyst per 100 parts by weight phloroglucinol.

In one or more embodiments, the initial mixture in which the reaction takes place includes greater than 10 parts by weight, in other embodiments greater than 25 parts by weight and in other embodiments greater than 50 parts by weight acid cation exchange catalyst per 100 parts by weight phloroglucinol. In these or other embodiments, the mixture in which the reaction takes place includes greater less than 500 parts by weight, in other embodiments less than 400 parts by weight and in other embodiments less than 200 parts by weight inorganic catalyst per 100 parts by weight phloroglucinol. In one or more embodiments, the mixture in which the reaction takes place includes from about 10 to about 500, in other embodiments from about 25 to about 400, and in other embodiments from about 50 to about 200 parts by weight acid cation exchange catalyst per 100 parts by weight phloroglucinol.

The skilled person can readily determine the appropriate level of any of the thiols or sulfides that should be used as co-catalysts with acid catalyst in the reaction. The co-catalyst will enhance the reaction rate by using the acidic catalyst and phloroglucinolic compounds together. In one or more embodiments, co-catalyst may be selected from the group consisting of sodium sulfate, sodium thiosulfate, sodium bisulfite, mercaptoethanol, sodium dithionite, thioglycolic acid, sodium sulfide and ethanethiol. In particular embodiments, the co-catalyst is thioglycolic acid.

The amount of cocatalyst introduced to the mixture and be described with reference to the amount of phloroglucinol initially present. In one or more embodiments, the initial mixture in which the reaction takes place includes greater than 0.01 parts by weight in other embodiments greater than 0.5 parts by weight and in other embodiments greater than 1 parts by weight inorganic catalyst per 100 parts by weight phloroglucinol. In these or other embodiments, the mixture in which the reaction takes place includes greater less than 30 parts by weight, in other embodiments less than 20 parts by weight and in other embodiments less than 10 parts by weight inorganic catalyst per 100 parts by weight phloroglucinol. In one or more embodiments, the mixture in which the reaction takes place includes from about 0.01 to about 30, in other embodiments from about 0.5 to about 20, and in other embodiments from about 1 to about 10 parts by weight inorganic catalyst per 100 parts by weight phloroglucinol.

Turning to the production of particular phloroglucinolic resins, it will be appreciated that when acetone is combined with a phloroglucinolic compound, such as a phloroglucinol, a phloroglucinolic resin is produced having an isopropyliden bridge structure and a relatively low molecular weight. The reaction is more particularly shown in Scheme I below.

(Scheme I)

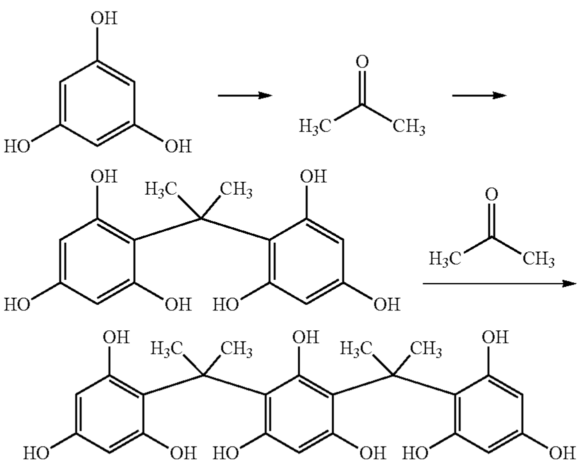

It will be appreciated that each isopropyliden bridge structure is a di-substituted methylene bridge having methyl groups as the substituted groups.

Similarly, when methyl ethyl ketone is used and combined with a phloroglucinolic compound, such as a phloroglucinol, a phloroglucinolic resin is produced having a 2,2-di-substituted butane bridge structure. The reaction is more particularly shown in Scheme II below.

(Scheme II)

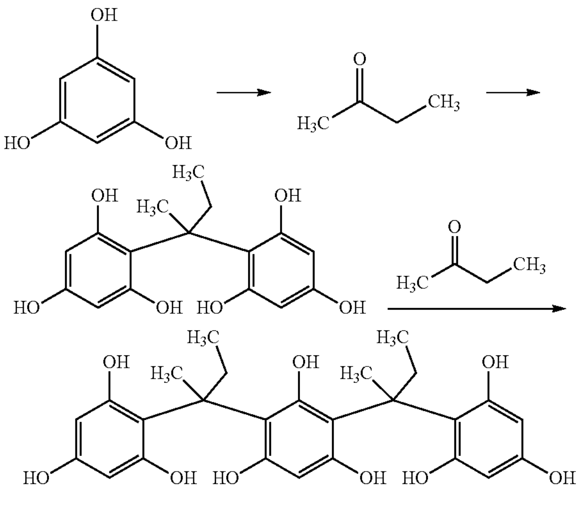

It will be appreciated that each 2,2-di-substituted butane bridge structure is a di-substituted methylene bridge having one ethyl group and one methyl group extending from the methylene bridge as the substituted groups.

Further, when methyl isobutyl ketone is employed and combined with a phloroglucinolic compound such as a phloroglucinol, a phloroglucinolic resin is produced having a 2,2-isopropyl, 4-methyl pentane bridge structure. The reaction is more particularly shown in Scheme III below.

(Scheme III)

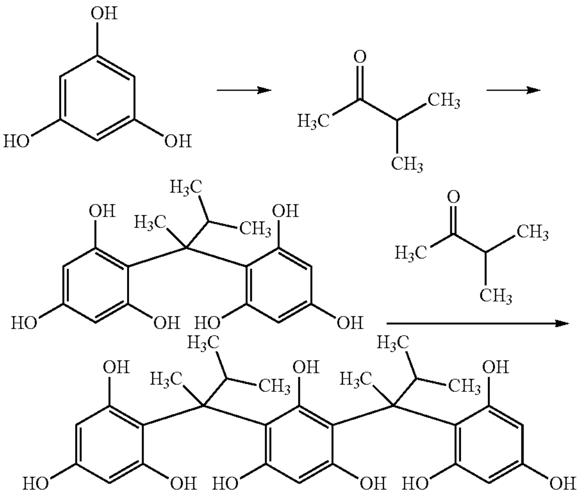

It will be appreciated that each 2,2-di-substituted, 4-methyl pentane bridge structure is a di-substituted methylene bridge having one isopropyl group and one methyl group extending from the methylene bridge as the substituted groups.

Upon removal of the solvent, the resultant product is a solid phloroglucinolic resin. Importantly, when compounded into vulcanizable rubber compositions, these solid phloroglucinolic resins have given rise to unexpected results including, among other things, improvements in the physical properties of the cured rubber (e.g. Shore A Hardness) and dynamic properties of the cured rubber (e.g. higher G'), and have been found to have adequate processing characteristics, such as sufficient cure times, previously not seen in alternative resins that do not include resorcinol.

As suggested above, the phloroglucinolic resins of the present invention are useful in vulcanizable rubber compositions. Besides the use of the phloroglucinolic resins of the present invention, the vulcanizable compositions may otherwise be conventional in nature. Accordingly, the rubber compositions may include a vulcanizable rubber, a curative, a filler, and a phloroglucinolic resin of the present invention.

With regard to the rubber compositions of the present invention, the rubber compositions may include a rubber component that may include any natural rubber, synthetic rubber or combination thereof. Examples of synthetic rubber include but are not limited to styrene butadiene copolymer, polyisoprene, polybutadiene, acrylonitrile butadiene styrene, polychloroprene, polyisobutylene, ethylene-propylene copolymer and ethylene-propylene-diene rubber.

The rubber compositions may also include one or more of the normal additives used in such compositions. Examples of such additives include carbon black, cobalt salts, stearic acid, silica, silicic acid, sulfur, peroxides, zinc oxide, fillers, antioxidants and softening oils.

Aspects of the present invention relate to the amount or loading of the solid Phloroglucinolic resins of the present invention within the vulcanizable compositions. In one or more embodiments, the vulcanizable compositions of the present invention include greater than 0.5, in other embodiments greater than 1.0, in other embodiments greater than 1.5, and in other embodiments greater than 2.0 parts by weight solid phloroglucinolic resin per 100 parts by weight rubber. In these or other embodiments, the vulcanizable compositions of the present invention include less than 7.0, in other embodiments less than 6.0, in other embodiments less than 5.0, and in other embodiments less than 4.0 parts by weight of the solid phloroglucinolic resin per 100 parts by weight rubber. In one or more embodiments, the vulcanizable compositions of the present invention include from about 0.5 to about 7.0, in other embodiments from about 1.0 to about 6.0, in other embodiments from about 1.5 to about 5.0, and in other embodiments from about 2.0 to about 4.5 parts by weight of the phloroglucinolic resin per 100 parts by weight rubber.

The rubber composition may also include one or more of a methylene donor component. The methylene donor component is any compound that generates formaldehyde upon heating during the vulcanization. Examples of such compounds are set forth in U.S. Pat. No. 3,751,331, which is incorporated herein by reference. Preferred methylene donor compounds are hexamethylenetetramine, di-methylol melamine, tri-methylol melamine, tetra-methylol melamine, penta-methylol melamine, hexa-methylol melamine, and mixtures thereof. The methylol melamines may be completely or partially etherified or esterified such as hexamethoxymethylol melamine. The methylene donor may be present in concentrations from about 0.1 to 15 parts per one hundred parts rubber or in other embodiments from 0.1 to 10 parts per one hundred parts rubber. The ratio of methylene donor to solid phloroglucinolic resin may be from 1:10 to 10:1.

As should be appreciated, the rubber component, additives, reinforcing materials and methylene donor compounds are known. In addition, the method of vulcanizing the compositions is known. The improvements of the present invention are related to solid phloroglucinolic resins.

The rubber compositions are prepared and used in the conventional manner of preparing and using such compositions. Namely, the compositions can be prepared by solid-state mixing.

In light of the foregoing, it will be appreciated that the rubber compositions produced according to the present invention may be used for various rubber applications or rubber goods. The uncured and cured rubber compositions of this invention may be used in tire applications or used to prepare portions of a tire, such as tire treads, belt skim stock, sidewalls, bead compounds, carcasses, or other areas of a tire. Other applications include rubber products that are useful for engine mounts and bushings. Still other examples of applications in which the uncured and cured rubber compositions of this invention may be used or used to prepare include technical or mechanical rubber goods such as hoses, pneumatic belts, and conveyor belts.

EXAMPLES

In order to demonstrate the practice of the present invention, the following examples have been prepared and tested. The examples should not, however, be viewed as limiting the scope of the invention. The claims will serve to define the invention. The abbreviation PG means "Phloroglucinolic."

PG Resin Example 1

25.2 g of phloroglucinol, 47.0 g of acetone, 50.4 g of toluene, 1.1 g of thioglycolic acid and 1.2 g of 98% sulfuric acid were charged to a flask and heated to 80° C. The reaction mixture was maintained at about 80° C. for 9 hours. Then, 3.8 g of a 25% solution of sodium hydroxide was added. Solvent was then removed by vacuum distillation to 155° C. When a temperature of 155° C. was reached, the vacuum was released and the resin was discharged from the flask.

PG Resin Example 2

30.3 g of phloroglucinol, 69.7 g of acetone, 1.3 g of thioglycolic acid and 20.0 g of acid cation exchange catalyst (DIAION PK212LH, Mitsubishi Chemical Corporation) were charged to a flask and heated to 70° C. The reaction mixture was maintained at about 70° C. for 22 hours. Then, 0.8 g of a 25% solution of sodium hydroxide was added. Solvent was then removed by vacuum distillation to 155° C. When a temperature of 155° C. was reached, the vacuum was released and the resin was discharged from the flask.

PG Resin Example 3

25.2 g of phloroglucinol, 24.4 g of acetone, 63.1 g of toluene, 1.1 g of thioglycolic acid and and 20.0 g of acid cation exchange catalyst (DIAION PK212LH, Mitsubishi Chemical Corporation) were charged to a flask and heated to 82° C. The reaction mixture was maintained at about 82° C. for 22 hours. Then, 1.2 g of a 25% solution of sodium hydroxide was added. Solvent was then removed by vacuum distillation to 155° C. When a temperature of 155° C. was reached, the vacuum was released and the resin was discharged from the flask.

PG Resin Example 4

80.0 g of phloroglucinol, 114.3 g of acetone and 63.5 g of acid cation exchange catalyst (DIAION PK212LH, Mitsubishi Chemical Corporation) were charged to a flask and heated to 70° C. The reaction mixture was maintained at about 70° C. for 24 hours. Then, 0.1 g of a 25% solution of sodium hydroxide was added. Solvent was then removed by vacuum distillation to 155° C. When a temperature of 155° C. was reached, the vacuum was released and the resin was discharged from the flask.

PG Resin Example 5

80.0 g of phloroglucinol, 114.3 g of acetone and 63.5 g of acid cation exchange catalyst (DIAION PK212LH, Mitsubishi Chemical Corporation) were charged to a flask and heated to 70° C. The reaction mixture was maintained at about 70° C. for 5 hours. Then, 0.1 g of a 25% solution of sodium hydroxide was added. Solvent was then removed by vacuum distillation to 155° C. When a temperature of 155° C. was reached, the vacuum was released and the resin was discharged from the flask.

PG Resin Example 6

25.2 g of phloroglucinol, 44.7 g of methyl ethyl ketone and 20.0 g of acid cation exchange catalyst (DIAION PK212LH, Mitsubishi Chemical Corporation) were charged to a flask and heated to 80° C. The reaction mixture was maintained at about 80° C. for 24 hours. Then, 0.1 g of a 25% solution of sodium hydroxide was added. Solvent was then removed by vacuum distillation to 155° C. When a temperature of 155° C. was reached, the vacuum was released and the resin was discharged from the flask.

PG Resin Example 7

50.0 g of phloroglucinol, 72.6 g of methyl ethyl ketone and 40.0 g of acid cation exchange catalyst (DIAION PK212LH, Mitsubishi Chemical Corporation) were charged to a flask and heated to 85° C. The reaction mixture was maintained at about 85° C. for 24 hours. Then, 0.1 g of a 25% solution of sodium hydroxide was added. Solvent was then removed by vacuum distillation to 155° C. When a temperature of 155° C. was reached, the vacuum was released and the resin was discharged from the flask.

PG Resin Example 8

50.0 g of phloroglucinol, 57.0 g of methyl ethyl ketone and 40.0 g of acid cation exchange catalyst (DIAION PK212LH, Mitsubishi Chemical Corporation) were charged to a flask and heated to 85° C. The reaction mixture was maintained at about 85° C. for 24 hours. Then, 0.1 g of a 25% solution of sodium hydroxide was added. Solvent was then removed by vacuum distillation to 155° C. When a temperature of 155° C. was reached, the vacuum was released and the resin was discharged from the flask.

PG Resin Example 9

25.2 g of phloroglucinol, 61.2 g of methyl isobutyl ketone and 20.0 g of acid cation exchange catalyst (DIAION PK212LH, Mitsubishi Chemical Corporation) were charged to a flask and heated to 117° C. The reaction mixture was maintained at about 117° C. for 22 hours. Then, 0.1 g of a 25% solution of sodium hydroxide was added. Solvent was then removed by vacuum distillation to 155° C. When a temperature of 155° C. was reached, the vacuum was released and the resin was discharged from the flask.

TABLE 1 below provides a general description of the ingredients used in the formation of the phloroglucinolic resin. It will be appreciated that either sulfuric acid (H2SO4) or cation exchange catalyst used as the acid catalyst in these examples, and that some of the examples further employed a co-catalyst such as thioglycolic acid.

TABLE 1

| | Phloroglucinolic Resin | | | | |
|---|---|---|---|---|---|
| | Ex. 1 | Ex. 2 | Ex. 3 | Ex. 4 | Ex. 5 |
| Resin | | | | | |
| Solvent | Toluene Acetone | Acetone | Toluene Acetone | Acetone | Acetone |
| Molar A:Phg | 4:1 | 5:1 | 2:1 | 3:1 | 3:1 |
| Catalyst | H2SO4 | PK212LH | PK212LH | PK212LH | PK212LH |
| Co-catalyst | Thiogly-colic acid | Thiogly-colic acid | Thiogly-colic acid | — | — |

| | Phloroglucinolic Resin | | | | RF Resin (Comp.) |
|---|---|---|---|---|---|
| | Ex. 6 | Ex. 7 | Ex. 8 | Ex. 9 | Ex. 10 |
| Resin | | | | | B-19-SC |
| Solvent | Methyl ethyl ketone | Methyl ethyl ketone | Methyl ethyl ketone | Methyl isobutyl ketone | |
| Molar A:Phg | 3:1 | 2.6:1 | 2:1 | 3:1 | |
| Catalyst | PK212LH | PK212LH | PK212LH | PK212LH | |
| Co-catalyst | — | — | — | — | |

It will be appreciated that, in order to provide a full analysis of the improvements provided by the uniquely prepared solid phloroglucinolic resins above, a resorcinol formaldehyde resin, available from Sumitomo Chemical under the tradename PENACOLITE® RESIN B-19-SC was provided a comparative RF resin. Thus, rubber compounds containing the phloroglucinolic resins described in the examples and in TABLE 1, as well as the comparative RF resin also provided in TABLE 1, were prepared according to the rubber composition shown in TABLE 2.

TABLE II

| Formulation (parts by weight). | |
|---|---|
| Natural Rubber | 100 |
| Carbon Black (HAF Black N326) | 55 |
| Zinc Oxide | 8 |
| Stearic Acid | 1 |
| N-(1,3-Dimethylbutyl)-N'-Phenyl-p-Phenylenediamine | 2 |
| Polymerized 1,2-Dihydro-2,2,4-Trimethylquinoline | 1 |
| Resin | 3 |
| Cobalt Salt (22% Co) | 0.45 |
| Insoluble Sulfur (20% Oil) | 5 |
| N, N-Dicyclohexyl-2-Benzothiazole Sulfenamide | 1 |
| Methylene Donor (HMMM, 72% Active) | 2.78 |

Rubber compositions containing each of the five phloroglucinolic resins were then tested as against a rubber composition contain the comparative RF resin (Example 6—Comparative), also set forth in TABLE 1. The rubber compositions were then tested for essentially the same properties and rubber performance characteristics.

The various physical properties and chemical analysis of the solid phloroglucinolic resin are provided in TABLE 3 below. It will be appreciated that, in evaluating the resin properties, the softening point of the resins was determined using the procedure described above and the molecular weight and oligomer distribution was determined by GPC analysis. The resultant rubber performance based upon the preparation of a vulcanized rubber as set forth below is also provided in TABLE 3. It will be appreciated that T'90 was measured with the Alpha Technologies MDR Rheometer (MDR2000) at 150° C., 0.5° arc and 1.6 Hz according to ASTM D-5289. The rubber compounds were cured at 150° C., 10 tons pressure, according to parameters obtained from the MDR2000 rheometric test data. G' and tan δ, an indicator of compound hysteresis or heat build-up, was measured with a TA Instruments rheometer (ARES) at 2.0% torsional shear strain at 1 Hz and 60° C. and was measured shore A Hardness according to ASTM D-2240. Unaged pull out force and humidity aged (21 days, 85° C./90RH) was measured according to ASTM D-2229.

TABLE 3

| Composition, properties, and rubber performance of Examples 1-9 | | | | | |
|---|---|---|---|---|---|
| | Ex. 1 | Ex. 2 | Ex. 3 | Ex. 4 | Ex. 5 |
| Physical Analysis | | | | | |
| Softening point, ° C. | 124.0 | 99.5 | 171.8 | 110.3 | 115.3 |
| Moisture, % | 0.82 | 1.07 | 0.75 | 0.31 | 0.20 |
| GPC Analysis | | | | | |
| Monomer (%) | 13.9 | 27.8 | 2.3 | 16.4 | 33.8 |
| Dimer (%) | 4.5 | 5.6 | 1.7 | 4.9 | 2.0 |
| Trimer (%) | 7.7 | 6.4 | 33.1 | 5.3 | 4.3 |
| Tetramer (%) | 36.9 | 30.2 | 14.3 | 39.8 | 32.1 |
| Penta + (1000+) (%) | 37.0 | 30.0 | 48.6 | 33.6 | 27.8 |
| Mn | 530 | 450 | 610 | 496 | 458 |
| Mw | 607 | 527 | 681 | 567 | 540 |
| Rubber performance | | | | | |
| MH dNm | 37.6 | 34.1 | 33.1 | 33.8 | 33.6 |
| T'90, Time (minutes), 150° C. | 12.8 | 13.1 | 14.8 | 15.8 | 14.5 |
| Unaged, 100% modulus, Mpa | 5.1 | 4.6 | 3.9 | 4.0 | 4.1 |
| G', 2.0% strain, 23° C. | 17.8 | 16.5 | 14.1 | 14.5 | 14.6 |
| tan δ, 2.0% strain, 23° C. | 0.194 | 0.197 | 0.216 | 0.209 | 0.210 |
| G', 5.0% strain, 23° C. | 12.9 | 12.0 | 10.2 | 10.5 | 10.6 |
| tanδ, 5.0% strain, 23° C. | 0.231 | 0.232 | 0.245 | 0.239 | 0.238 |
| Unage Pull Out Force, N | 1372 | 1358 | 1339 | 1234 | 1196 |
| Humidity aged Pull Out Force, N | 856 | 1065 | 1101 | 1059 | 1078 |
| Shore A Hardness | 82.0 | 79.6 | 76.9 | 78.9 | 79.3 |
| | Ex. 6 | Ex. 7 | Ex. 8 | Ex. 9 | Comp. Ex. 10 |
| Physical Analysis | | | | | |
| Softening point, ° C. | 102.5 | 83.7 | 100.5 | 102.7 | 110.3 |
| Moisture, % | 0.17 | 0.75 | 0.31 | 0.25 | 0.29 |
| GPC Analysis | | | | | |
| Monomer (%) | 21.7 | 1.2 | 13.1 | 6.5 | |
| Dimer (%) | 63.6 | 67.5 | 71.7 | 68.3 | |
| Trimer (%) | 14.7 | 25.7 | 15.2 | 17.5 | |
| Tetramer (%) | 0.0 | 5.6 | 0.0 | 7.7 | |
| Penta + (1000+) (%) | 0.0 | 0.0 | 0.0 | 0.0 | |
| Mn | 437 | 565 | 515 | 536 | |
| Mw | 467 | 591 | 546 | 567 | |

TABLE 3-continued

Composition, properties, and rubber performance of Examples 1-9

| | | | | | |
|---|---|---|---|---|---|
| Rubber performance | | | | | |
| MH dNm | 35.1 | 35.2 | 37.1 | 37.5 | 30.9 |
| T'90, Time (minutes), 150° C. | 15.1 | 15.9 | 14.3 | 14.6 | 15.4 |
| Unaged, 100% modulus, Mpa | 4.0 | 3.8 | 4.8 | 4.4 | 3.6 |
| G', 2.0% strain, 23° C. | 15.9 | 15.3 | 14.7 | 14.5 | 12.7 |
| tan δ, 2.0% strain, 23° C. | 0.209 | 0.208 | 0.208 | 0.202 | 0.220 |
| G', 5.0% strain, 23° C. | 11.4 | 11.1 | 10.5 | 10.5 | 9.2 |
| tanδ, 5.0% strain, 23° C. | 0.241 | 0.238 | 0.242 | 0.234 | 0.247 |
| Unage Pull Out Force, N | 1172 | 1234 | 1338 | 1291 | 1122 |
| Humidity aged Pull Out Force, N | 1165 | 1167 | 866 | 1066 | 867 |
| Shore A Hardness | 80.5 | 80.0 | 80.8 | 80.1 | 74.6 |

In comparison between the phloroglucinolic resins of the present invention and those of the comparative examples, it will be appreciated that the phloroglucinolic resins of the present invention improve the mechanical properties of the cured rubber compound and provides better adhesion properties compared to the conventional resorcinol formaldehyde resin.

Still further, the phloroglucinolic resins of the present invention have significantly less range of Mw that do the comparative example. In the present invention, a Mw of greater than 400 and less than 700 g/mole, while I the comparative example. The Mw is greater than 700 g/mol.

Various modifications and alterations that do not depart from the scope and spirit of this invention will become apparent to those skilled in the art. This invention is not to be duly limited to the illustrative embodiments set forth herein.

What is claimed is:

1. The solid phloroglucinolic resin defined by formula (II)

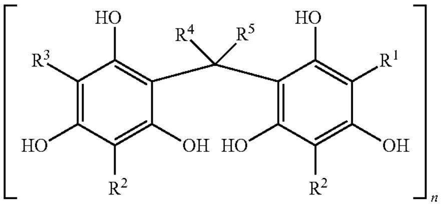

wherein n is an integer from 1 to 20, wherein R1 and R3 may be the same or different, and each either form a di-substituted methylene bridge, or is a hydrogen atom, wherein R2 is a hydrogen atom, and wherein R4 and R5 may be the same or different, and are alkyl groups, wherein the resin has a Mw of greater than 400 g/mole and less than 700 g/mole.

2. The solid phloroglucinolic resin as claimed in claim 1, wherein R4 and R5 are both methyl groups, and wherein the di-substituted methylene bridge formed is an isopropyliden bridge.

3. The solid phloroglucinolic resin as claimed in claim 1, wherein R4 is an ethyl group and R5 is a methyl group, and wherein the di-substituted methylene bridge formed is a 2,2 di-substituted butane bridge.

4. The solid phloroglucinolic resin as claimed in claim 1, wherein R4 is an isopropyl group and R5 is a methyl group, wherein the di-substituted methylene bridge formed is a 2,2 di-substituted, 4-methyl pentane bridge.

5. A method for making the solid phloroglucinolic resin as claimed in claim 1 comprising the reaction product of a phloroglucinol and a ketone, defined as formula R4C(═O)R5, in the presence of an acid catalyst.

6. The method of making the solid phloroglucinolic resin as claimed in claim 5, wherein the ketone is selected from the group consisting of acetone, methyl ethyl ketone (MEK), diethyl ketone, ethyl butyl ketone, diisobutyl ketone, methyl isopropyl ketone, diisopropyl ketone, and methyl isobutyl ketone (MIBK).

7. The method of making the solid phloroglucinolic resin as claimed in claim 5, wherein the ketone is selected from the group consisting of acetone, methyl ethyl ketone, and methyl isobutyl ketone.

8. The method of making the solid phloroglucinolic resin as claimed in claim 5, wherein the acid catalyst is selected from the group consisting of inorganic acids and acid cation exchange resins.

9. The method of making the solid phloroglucinolic resin as claimed in claim 5, wherein a molar ratio of ketone to phloroglucinol is more than 1:1 and less than 20:1.

10. The method of making the solid phloroglucinolic resin as claimed in claim 5, wherein the resin includes less than 40 wt. % unreacted phloroglucinol.

11. The solid phloroglucinolic resin as claimed in claim 1, where the resin has a softening point of greater than 80° C.

12. The solid phloroglucinolic resin as claimed in claim 1, where the resin includes less than 1.5 wt. % water.

13. The solid phloroglucinolic resin as claimed in claim 1, where the resin has pentamer or higher oligomer content of less than 55% according to GPC using a polystyrene standard.

14. A vulcanizable rubber composition comprising:

a. a vulcanizable rubber;

b. a curative; and c. a solid phloroglucinolic resin as claimed in claim 1.

15. A vulcanized rubber prepared from the vulcanizable composition of claim 1.

16. A vulcanizable rubber composition comprising:

a vulcanizable rubber;

a curative; and a solid phloroglucinolic resin which is made by the method as claimed in claim 5.

17. A vulcanized rubber prepared from the vulcanizable composition of claim 16.

18. The solid phloroglucinolic resin as claimed in claim 1, wherein the resin includes less than 40 wt. % unreacted phloroglucinol.

* * * * *